FIG. 1 PREFERRED DOUGH METHOD

Feb. 11, 1969   J. A. CORNELL   3,427,274
IMPACT RESISTANT, ALKALI-WASHED MIXED BUTADIENE-STYRENE
AND METHYL METHACRYLATE MOLDING COMPOSITION
Filed May 10, 1966

INVENTOR
JOHN A. CORNELL

BY Abraham A. Saffitz
ATTORNEY

United States Patent Office 3,427,274
Patented Feb. 11, 1969

3,427,274
IMPACT RESISTANT, ALKALI-WASHED MIXED BUTADIENE-STYRENE AND METHYL METHACRYLATE MOLDING COMPOSITION
John A. Cornell, Philadelphia, Pa., assignor to Sartomer Resins Inc., Essington, Pa., a corporation of Delaware
Filed May 10, 1966, Ser. No. 548,891
U.S. Cl. 260—31.8
Int. Cl. C08f 29/50, 47/04, 15/16
7 Claims

ABSTRACT OF THE DISCLOSURE

Impact resistant translucent or transparent molding composition adapted to produce rigid molded products consisting of at least 90% by weight of suspension or bulk polymerized methylmethacrylate resin of molecular weight 300,000 to 600,000 and from 2–5% of rubbery butadiene-styrene copolymer containing at least 65% butadiene, the rubbery copolymer being in the form of latex particles of from 0.1 to 10 microns in size and being co-emulsified with 40–60% of methylmethacrylate in aqueous dispersion polymerization whereby each latex particle is coated with methylmethacrylate polymer formed in situ by a free radical catalyst present in the aqueous dispersion. Prior to incorporation of the coated rubbery butadiene-styrene copolymer latex in the methylmethacrylate medium, the co-emulsified product is washed with strong alkali at temperatures of 20–60° C. for one to four hours. If the co-emulsified latex is not so washed with alkali, the molded product loses its rigidity if subjected to a prolonged water boiling test and crumbles. Only the alkali-washed product used in the molding composition produces tough, age-resistant, transparent or translucent plastics for dental or automobile headlight lens use.

The present invention relates to a new rigid, tough and translucent resin molding composition consisting essentially of at least 90% by weight of suspension or bulk polymerized methyl methacrylate and from 2–5% of rubbery butadiene-styrene copolymer (65–90 butadiene and 35–10 styrene). The product molded from the composition is water resistant, impact resistant and aging resistant. The solid methyl methacrylate resin component having a molecular weight of about 300,000 to 600,000 (calculated from a viscosity determination in ethylene dichloride) is mixed with a special form of rubbery copolymer which starts as latex particles of from 65:35–90:10 butadiene-styrene copolymer.

The rubbery butadiene-styrene latex particles in a size of from 0.1 to 10 microns are co-emulsified with from 40–60%, based on total weight, of methyl methacrylate and the methacrylate is polymerized with a free radical polymerization catalyst, such as benzoyl peroxide, in an aqueous dispersion medium. This polymerization effectively coats the copolymer latex with methyl methacrylate polymer.

The product so recovered is then washed under strongly alkaline conditions (pH of 11–13) at temperatures of from 20–60° C. for from 1–4 hours, flushed with water to pH 7 and tested to demonstrate freedom from sulfate, sulfide, sulfur and inorganic ash. The recovered product is thus an alkaline treated coemulsified polymer wherein the individual rubbery latex particles have been surrounded by methacrylate and these alkaline-treated particles are recovered after washing in the form of aggregates varying from 20 to 100 microns in diameter.

If the foregoing alkaline washing step is not carried out, the mixtures of the methyl methacrylate polymer and butadiene-styrene copolymer components in the above-specified proportions will not provide moisture-resistant, molded products to meet the rigid requirements for use as dental plastic materials. Moisture causes the breakdown of the methyl methacrylate mixture containing ordinary or untreated butadiene-styrene rubbery copolymer in the range of 2–5%. Specifically, prolonged exposure to water causes the molded product to lose its rigidity, to become opaque, to lose it toughness, to become porous and to crumble with age.

The moisture-resistant, alkaline-treated, impact-resistant butadiene-styrene modified methyl methacrylate resin composition of the present invention is uniquely adapted to be used in any one of three forms:

(a) As a dental dough or commercial putty-like caulking composition;
(b) As a gel slab containing polymerization inhibitor, used as a molding cake or sheet and stored in a refrigerator; and
(c) In the form of molding beads or pearls, obtained by suspension polymerization and used in injection molding.

The molding composition of the present invention is especially useful for the production of methyl methacrylate dentures and injection molded automobile tail light and back-up light covers.

Figure 1:
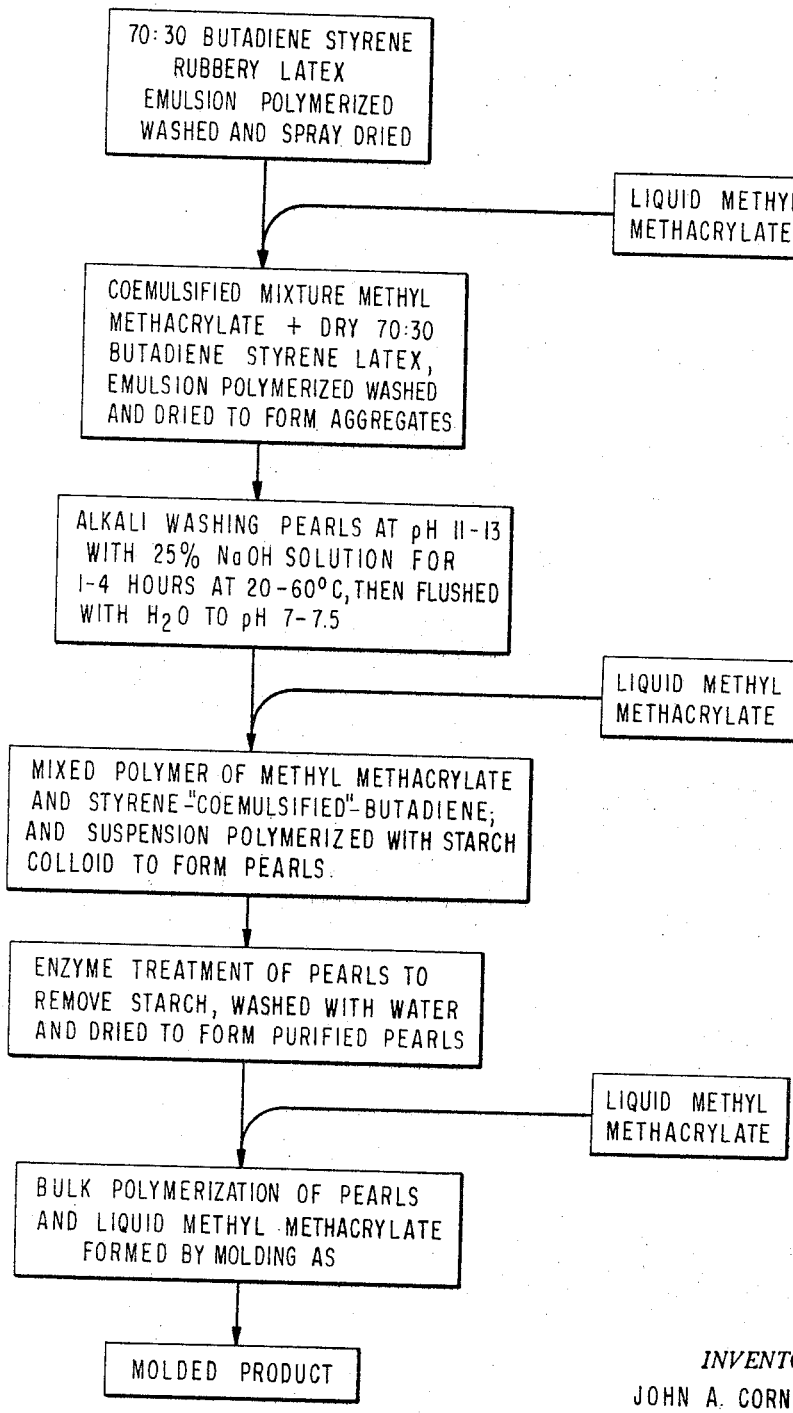

Reference is made to FIG. 1 herein which is a flow diagram illustrating the critical sequence of mixing, manufacturing and washing steps and emphasizing the criticality of the washing step because it uniquely imparts the desired characteristics of rigidity, toughness, translucency, impact resistance and aging resistance of the final product when it is subjected to prolonged exposure to water.

Figure 2:
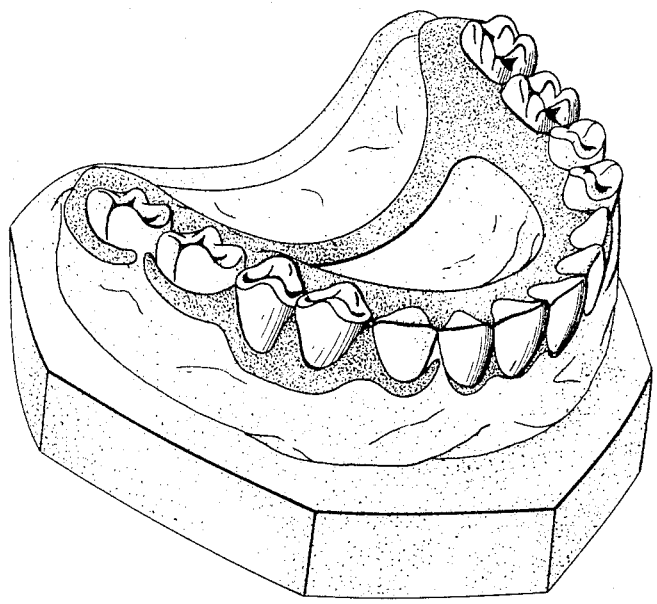

FIG. 2 shows a partial denture on stone model, the denture having the clasps and the palate bridge made integrally with denture base. These clasps are commercially feasible integral clasp, practical only due to the composition of the present invention and are unique.

Figure 3:
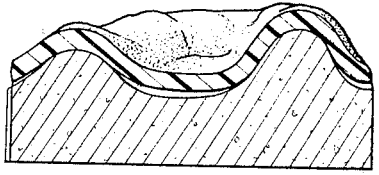

FIG. 3 shows a denture blank 2 on stone model, the denture base material being alkaline-treated rubbery butadiene-styrene copolymer mixed with methyl methacrylate in the molding composition of the present invention. The blank has been cut through by sawing to demonstrate the minimal warpage separation of the molded plastic blank of the present composition from the stone model. The warpage illustrated in FIG. 3 is that observed after placing the blank, free from the model, in boiling water and maintaining it in boiling water for ½ hour. This ½ hour boiling water test approximates the conditions of stress release under moisture conditions in the mouth of the wearer of the plate in a period of from six months to one year.

Figure 4:
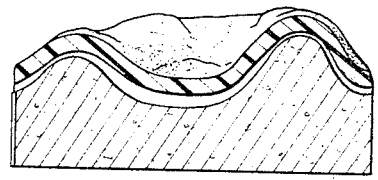

FIG. 4 shows a denture blank 3 on stone model, the denture blank material being rubbery butadiene-styrene copolymer mixed with methyl methacrylate in the same proportions and manner as the molding composition of the present invention, but not being alkaline-treated and washed and the blank being subjected to the same testing conditions as the blank of FIG. 3. The warpage separation in FIG. 4 is of such magnitude as to make a plate made from the material completely unsuitable for us in the mouth.

To facilitate evaluation of the unsatisfactory degree of warpage illustrated in FIG. 4 and the minimal separation shown in FIG. 3, reference is made to the article by Gowman, Cornell and Powers, "Effect of Composition on Dimensional Stability of Denture Bases," J. Am. Dental Asso., 70, May 1965, pages 1200–1203. Comparison of the cross sections of the blanks with those shown in the article establishes that:

(a) The distortion of the unwashed material in FIG. 4 herein is worse than that of high molecular weight (600,000) methyl methacrylate dental dough compositions; and (b) The minimal distortion of the washed material of FIG. 3 herein is no more than the distortion observed with the best materials shown in the illustrations of this article.

Careful physical examination of the blanks 2 and 3 discloses substantial differences which extend beyond the warpage. Blank 2, pigmented in the standard dental pink shade, is unchanged in color after the ½ hour boiling test. Blank 3 is severely blanched after this test. The surface of blank 2 is smooth and glossy, while the surface of blank 3 is roughened and chalky, evidencing degradation by water.

PRIOR ART

The prior synthetic, plastic material which came closest to the idea for a denture base or plate composition is that described in Tidd, U.S. Patent No. 2,013,295, and comprises methyl methacrylate molded powder plasticized with non-toxic, high boiling diesters of phthalic acid and the like, the amount of plasticizer being up to 10 parts per 100. The processing and pigment technique in the Tidd patent is widely followed in the art in order to meet the requirement for the ordinary dental laboratory.

Many attempts have been made to improve the known defects of the plasticized Tidd composition as, for example, in Joy, U.S. Patent No. 2,532,502; Crowell et al., U.S. Patent No. 2,315,503; and Hibbard, U.S. Patent No. 3,029,223.

Joy, in U.S. Patent No. 2,532,502, stated his dissatisfaction with "Luxene-44," which is the vinyl polymer gel of the Crowell et al. patent, on the ground that the vinyl gel cannot be cured with the simple, inexpensive equipment and that special precautions must be taken for storing and curing the material. Joy proposed an improvement over Crowell et al. which included substantial proportions of polyvinyl butyral resin (up to 25%). To the best of my knowledge, the product of the Joy patent has never been used commercially because the improvement in physical properties alleged in the patent were insufficient to justify replacing the Crowell et al. composition which is much lower in cost.

Hibbard, in U.S. Patent No. 3,029,223, exemplifies a typical impact resistant composition of styrene-methyl methacrylate and rubbery copolymer of styrene and butadiene which is designed for maximum impact strength consistent with a high degree of transparency and low APHA color rating. The Hibbard composition is injection molded and is of the type which is used in dentistry.

The present composition is different from Hibbard's composition in that it employs from 2–4% by weight of the butadiene-styrene copolymer in contrast to from 5–10% by weight which is taught in Hibbard in that it employs a much higher percentage of butadiene in the copolymer than does Hibbard's, e.g. 65–90% in the present composition vis-a-vis 55–57% in Hibbard's composition.

It is surprising that a higher proportion of butadiene in the copolymer and a smaller proportion of rubbery copolymer can be used in the composition of the present invention to achieve a workable dental dough composition having such high impact strength, good aging and good light transmission characteristics.

Another example of impact resistant methyl methacrylate composition of the vinyl halide gel type is Feuer, U.S. Patent No. 2,943,074. This composition is similar in its capability for use in dentistry to the Crowell et al. patent, e.g., the "Luxene-44" material mentioned by Joy. The Feuer patent discloses a butadiene styrene copolymer which is similar to that in the present invention but which must use 13% of this copolymer (15 parts in 115 parts total weight) in order to achieve the desired impact resistance in contrast to the 2–4% used in the present invention.

Feuer's product cannot be used out of doors because it ages and deteriorates very badly.

Plastics performance standards under A.S.T.M. Specifications, Volume 9, 1961, are very widely accepted tests in the art. In the dental field these A.S.T.M. tests are widely performed and additional testing in the dental field is also required under Americal Dental Association Specifications, No. 12 for denture resins and No. 15 for acrylic resin teeth. The test data in the table below were obtained under A.D.A. Specification No. 12, second revision, for water sorption, solubility and transverse deflection. In addition to the A.D.A. Specification No. 15 test for three hours in boiling water, a more stringent test for 16 hour boiling in water has been performed and reported in the table below.

Surprisingly, the butadiene-styrene interpolymer which was not given strongly alkaline wash treatment prior to its suspension polymerization with methyl methacrylate to form polymer beads produced a totally inadequate denture molding. This inadequate product became white and opaque after 3 hours in boiling water. The translucency, as measured by percent light transmission for standard pink-pigmented sample, dropped by a factor of 70%.

The falling ball impact test, which was carried out by the method of Cornell et al., J. Pos. Dent. 10, 516–24 (1960), on samples made from the unwashed composition soaked in water for one week showed breakage of all samples on the very first blow.

In contrast, the same falling ball impact test was carried out with samples made from the composition which had been given the strongly alkaline wash treatment, at pH 11–13, prior to forming the beads and pearls by suspension polymerization. The results of this test show that all of the samples remained unbroken after as

TABLE I

| Test | A<br>Product of the invention | B<br>Poly MM | C<br>Plasticized poly MM | D<br>Unwashed | C<br>ADA specification |
|---|---|---|---|---|---|
| 1. ADA, spec. 12, 2nd revision: | | | | | |
| Water sorption | .440 mg./cm.$^2$ | .550 | 0.57 | .60 | Less than 0.7 mg./cm.$^2$ |
| Solubility | Less than .005 mg./cm.$^2$ | Less than .005 | Less than .005 | .007 | Less than 0.04 mg./cm.$^2$ |
| Ultraviolet light stability S1 lamp 72 hours | Very slight change | No change | No change | Substantial change | Slight change |
| 2. ADA spec. 15—3 hr. boiling water | No change | do | do | Strong bleach | No change |
| 3. Boiling in water 16 hours | Slight haze | No haze | do | Opaque white | |
| 4. Falling ball impact:* | | | | | |
| Dry testing: | | | | | |
| Unbroken 1 blow | 100% | 65% | 60% | 100% | |
| Unbroken 5 blows | 100% | 30% | 35% | 100% | |
| Unbroken 100 blows | 100% | None | None | 100% | |
| Soaked in water 1 week: | | | | | |
| Unbroken 1 blow | 100% | 48% | 80% | 0% | |
| Unbroken 5 blows | 100% | 16% | 54% | 0% | |
| Unbroken 50 blows | 50% | None | None | 0% | |
| 5. A.S.T.M. D 256-57 izod notched | 0.832 ft. lb | 0.32 ft. lb | 0.344 ft. lb | | |

*Cornell, J. A., et al., J. Pros. Dent, 10, 516–24 (1960).

many as 5 blows and 50% were still unbroken after 50 blows.

Based upon this performance, the samples from the composition which were not given strong alkali wash treatment are obviously unsuitable for use in the mouth. This is emphasized in the table if we compare the falling ball data for water soaked samples in column C which represents the 10% dibutyl phthalate plasticizzed denture base composition of Tidd in U.S. Patent No. 2,013,295.

In addition to the tests which are reported in the foregoing table, the composition of the present invention summarized in column A and manufactured in accordance with Example I herein, was tested to determine that it fully complied with all of the other requirements under ADA Spec. No. 12, 2nd Revision, for acrylic denture base material, including the Transverse Deflection tests which are carried out in wet condition.

In brief summary, the above demonstrate wholly unexpected results in aging resistance and impact resistance under water or moist environmental conditions which are dependent upon the alkaline washing treatment shown in FIG. 1 herein.

The best material of the prior art is the standard plasticized denture base composition of column C. The present alkaline-washed composition is unexpectedly superior to this standard plasticized composition. This unexpected superiority is even more surprising since the composition of the invention in column A is cross-linked by adding a cross-linking agent to the monomer, and generally, addition of cross-linking agents tend to decrease izod impact resistance.

Up to 10% of standard, dentally acceptable crosslink agent may be added, such cross-linkers as allyl methacrylate, ethylene glycol dimethacrylate or triethylene glycol dimethacrylate being the preferred examples. The best proportions of these preferred cross-linking agents are as set forth in the article entitled "Physical Properties of Denture-Base Materials," Cornell, J. A., et al., Journal of Prosethetic Dentistry, 10, 516–524 (1960).

The following examples show preferred putties, gels and injection molding particles made from the new alkaline-washed mixture of methyl methacrylate coemulsified with rubbery butadiene-styrene latex.

EXAMPLE I

Preferred use of the composition in a dental putty formulation—preparation of composition A

PART A.—PREPARATION OF BUTADIENE-STYRENE LATEX

A 70:30 mixture of butadiene-styrene is emulsion polymerized to about 60% conversion in the aqueous medium of the following recipe which is used as the dispersing medium for 100 parts of the mixture of the two monomers:

| | Parts |
|---|---|
| Diisobutyl naphthalene sodium sulfate (Nekal BX) | 2.85 |
| Linoleic acid | 2.00 |
| Dodecyl mercaptan | 0.02 |
| Sodium hydroxide | 0.05 |
| Potassium persulfate | 0.45 |
| Water | 100.00 |

The polymerization is carried out at 50–60° C. for 30 hours. The proportions of butadiene-styrene can vary only within the narrow limits of 68:32–70:30. When the butadiene level is above 70%, the alkaline-washed product (see FIG. 1) ages poorly and becomes opaque. If the butadiene level is below about 65%, the desirable impact resistance characteristics are lost.

Instead of potassium persulfate, sodium or ammonium persulfate can be used in the same proportions as given in the recipe. The above recipe is conventional and follows that shown in Schildknecht, "Vinyl and Related Polymers," John Wiley and Sons, Inc., New York (1952).

If desired, the 70:30 latex copolymer can be prepared with reducing agents other than linoleic acid. The reducing agents shown in Resin Review, Vol. XIV, No. 1 (1964) at pages 20–22, which are sodium sulfoxylate formaldehyde and sodium hydrosulfite, may be used in redox catalysts systems in accordance with the recipes shown in this magazine. These recipes are based upon 0.5% ammonium persulfate catalyst plus an equivalent molar amount of the sodium sulfoxylate formaldehyde or sodium hydrosulfite at temperatures of 50–60° C. in emulsion polymerization. The Resin Review procedures and recipes are more sophisticated than the Schildknecht recipe in that they include chelated promoters and peroxide or hydroperoxide catalyst supplements, e.g. 0.01% by weight of monomers or tertiary butyl hydroperoxide.

Under conditions where the latex is to be made in the laboratory and expense is not a factor, the more sophisticated recipes may be desirable because the 30-hour polymerization time can be reduced.

An example of this more sophisticated recipe is the redox formula for the copolymer of 70:30 butadienestyrene as given below.

| | G. |
|---|---|
| Deionized water | 376 |
| Sodium alkyl aryl polyether sulfonate (Triton X–200) | 24 |
| Butadiene | 140 |
| Styrene | 60 |
| Polymethacrylic acid | 2 |
| Solution of 0.1 g. ferrous sulfate in 200 ml. of water, representing 0.7 p.p.m. of iron in the emulsion | 4 |
| Ammonium persulfate | 1 |
| Sodium sulfoxylate formaldehyde monohydrate (Formopon) | 0.7 |
| Tertiary butyl hydroperoxide (70%) | 0.25 |

PART B.—POLYMERIZATION OF CO-EMULSIFIED LATEX COPOLYMER AND METHYL METHACRYLATE (10:90 MIXTURE) AND CRITICAL WASHING STEP

To 50 parts of the latex copolymer obtained as in Part A above, there is added 50 parts of methyl methacrylate monomer in a total volume of 150 parts of water containing 3.5 parts of sodium lauryl sulfate, 0.25 part of dodecyl mercaptan and 0.1 part benzoyl peroxide. Polymerization is carried out for 18 hours at 60° C. and the product is coagulated by conventional spray drying. The dried product is then washed free of sulfur and dried in a tray drier and, when observed under an electron microscope, discloses particles of 1–10 microns in size.

The dried product is then alkaline treated with 25% aqueous sodium hydroxide for 3½ hours at a temperature of 60° C. and flushed with water to pH 7–7.5. At this point, testing of the product demonstrates that it is free from sulfate, sulfide, sulfur and inorganic ash. Thus, the so-recovered product is an alkaline-treated, coemulsified polymer wherein the discrete rubbery latex particles are surrounded by methyl methacrylate resin.

10 parts of this alkaline-treated product are then suspension polymerized with 90 parts of methyl methacrylate in 400 parts by volume of water using 1.5 parts of starch as the suspension colloid and 1 part of benzoyl peroxide as the catalyst. The molecular weight of the suspension product is 450,000–600,000. The polymerized suspension is filtered and the starch is removed therefrom by hydrolyzing overnight with diastase enzyme. The so-purified polymer is then subjected to Tyler Screen analysis and the screen distribution is as follows:

| | |
|---|---|
| On 80 | Trace |
| 100 | 2 |
| 140 | 9 |
| 240 | 68 |
| Through 240 | 23 |

The washed and dried starch-free beads are employed in the standard denture dough mix consisting of 2 parts by weight of beads to 1 part by weight of methyl methacrylate monomer. This denture dough is that tested in column A of Table I. This methyl methacrylate monomer is altered by adding 10% of the standard, dentally acceptable cross-linking agent, ethylene glycol dimethacrylate. This corresponds to the Tidd formulation in accordance with commercial practice. The dental dough mixture employing 10% ethylene glycol dimethacrylate cross-linker in the monomer is blended for a period of about 10 minutes so that it becomes suitable for packing. At the end of 9 minutes the mixture was found not to stick to the spatula and could be packed in a dental flask by a technique standard to the dental industry. The mass remained in a packable condition for 15 minutes, after which it was too stiff to pack and should be discarded. The packed flask was cured for 90 minutes at 163° F. (73° C.) and then 30 minutes at 212° F. (100° C.) or for 16 hours at 163° F. (73° C.). The partial denture having integral clasps of the same material is shown in FIG. 2 herein and was tested and was demonstrated to be superior to standard methyl methacrylate monomer-polymer denture material in respect to resistance to breakage.

EXAMPLE II

This example illustrates a modification of the putty formulation of Example I in which a long-working additive is incorporated into the putty during the mixing of the suspension pearls.

An 85:15 copolymer of ethyl acrylate and methyl methacrylate, prepared as described in Cornell et al., U.S. Patent No. 2,947,716, except that 10% of the alkaline-treated product of Example I is used in the suspension polymerization, is added in the form of polymerized beads to the solid component of the dental dough of Example I. Instead of using 2 parts of the polymer beads in Example I, these beads containing 5% of 70:30 butadienestyrene copolymer in 95% methyl methacrylate polymer, there are used 1.6 parts of said beads and 0.4 part of the 85:15 ethyl acrylate-methyl methacrylate copolymer beads as the long-working additve in the solid phase of the dental dough. The liquid phase consists of 1 part of methyl methacrylate monomer for each 2 parts total of the beads. As a result of this addition of long-working additive, the working time of the dough at 25° C. (room temperature) increases from ¼ hour up to 1 hour.

EXAMPLE III

This example illustrates the addition of plasticizer to the polymer phase of the dental dough of Examples I and II. Dibutyl phthalate in an amount of 5% of the total polymer phase is added as the plasticizer. The products so obtained are tested and an improvement of mixing properties of both samples is noted in contrast to the unplasticized dough formulations. These plasticized products provide superior dentures of the type illustrated in FIG. 2 because of improved flexibility.

EXAMPLE IV

This example illustrates the use of a preferred plasticizer other than dibutyl phthalate to enhance optical transmission, the plasticizer being 2-ethyl hexyl diphenyl phosphate instead of the dibutyl phthalate of Example III. In both the long-working and the regular embodiments, the phosphate plasticized dentures have improved transparency characteristics.

EXAMPLE V

This example illustrates the loss of optical transmission of the compositions of columns A and D of Table I after the 16 hour boil test.

In preparing the samples of columns A and D, an ultraviolet stabilizer was used, the stabilizer being 2,2-dihydroxy-4-methoxy-benzophenone in an amount of about 2% by weight of the total dough.

Table II below shows the results.

TABLE II

| Sample | Thickness, inches | Percent transmission | Percent retention of transmission |
|---|---|---|---|
| A. Properly washed: | | | |
| Initial | 0.24 | 15.0 | |
| After 16 hr. boil | 0.25 | 13.5 | 90 |
| B. Unwashed: | | | |
| Initial | 0.238 | 12.0 | |
| After 16 hr. boil | 0.235 | 3.5 | 29 |

EXAMPLE VI

This example illustrates a compression molding composition which is used to make an impact resistant cover for automobile back-up and tail lights.

The dough compositions of Examples I and II were stabilized against ultraviolet light using 2-hydroxy-4-methoxy benzophenone as the stabilizer and using Sudan Red MR as the red acrylic soluble dye to match the standard red tail light color. The stoplight was molded on a plaster of Paris form under the molding conditions taught in Cornell et al. U.S. Patent No. 2,947,716.

A highly impact-resistant product was obtained.

EXAMPLE VII

The following example illustrates an injection molded automobile tail light cover.

Beads as used in Example I (alkaline-treated) were dyed with Sudan Red MR dye and 2% by weight of the ultraviolet stabilizer of Example V was admixed therewith to form an injection molding powder. This powder was injection molded in a standard machine designed for producing oval-shaped closures used in the form of an automobile tail light cover in the standard STOP–RED color. The product was highly impact-resistant.

Cross-linking agents other than ethylene glycol dimethacrylate which may be used with the alkaline-treated impact-resistant composition in dental and commercial formulations are:

Allyl methacrylate
Diethylene glycol diacrylate
1,4-butylene glycol dimethacrylate
Triethylene glycol dimethacrylate
Tetraethylene glycol dimethacrylate
Trimethylol propane trimethacrylate
Diethylene glycol dimethacrylate
Diallyl ether of trimethylol propane monomethacrylate In most applications, it is preferred that the dental composition be pigmented. Pigmentation is carried out with generally pure dental pigments such as mercury sulfide, cadmium sulfide, cadmium selenide, zinc oxide, titanium dioxide, carbon black, iron oxide, burnt umber, ultramarine blue, chrome green, chromate yellow, etc.

Commercial pigments may be employed for applications where the water-resistance requirements are less stringent than in the dental field.

Other plasticizers may be employed, such as tricresyl phosphate, triphenyl phosphate, dibutyl sebacate, dioctyl phthalate and methyl phthalate glycolate or polymeric ester plasticizers, such as Rohm & Haas G–60, but it is preferred to use these in admixture with dibutyl phthalate because of its excellent working properties during injection molding and compression molding. Generally, up to 40% of the plasticizer requirement can be met by the plasticizer other than dibutyl phthalate which represents the remainder in preferred plasticizer formulations designed for severe water use conditions.

Other ultraviolet stabilizers which can be used include methacrylate-substituted benzophenone, available as "Permasorb MA" from National Starch Company, and hydroxy phenyl benzotriazole, available from Geigy under the names "Tinuvin 326" and "Tinuvin 327."

Having thus disclosed the invention, I claim:

1. A translucent resin molding composition consisting essentially of a mixture of at least 90% by weight of polymerized methyl methacrylate of molecular weight 300,000 to 600,000 based upon viscosity in ethylene dichloride and from 2–5% of rubbery butadiene-styrene copolymer latex in particle size of from 0.1 to 10 microns in which the rubbery butadiene-styrene latex particles are co-emulsified with from 40–60%, based on total weight, of methyl methacrylate, the methacrylate being polymerized in situ with free radical polymerization catalyst to coat the copolymer latex with methyl methacrylate polymer and the mixed product is free from sulfate, sulfide, sulfur and inorganic ash.

2. An impact resistant, water resistant and aging resistant molded denture formed from a composition consisting essentially of a mixture of at least 90% by weight of polymerized methyl methacrylate of molecular weight 300,000 to 600,000 based upon viscosity in ethylene dichloride and from 2–5% of rubbery butadiene-styrene copolymer latex in particle size of from 0.1 to 10 microns in which the rubbery butadiene-styrene latex particles are co-emulsified with from 40–60% based on total weight, of methyl methacrylate, the methacrylate being polymerized in situ with free radical polymerization catalyst to coat the copolymer latex with methyl methacrylate polymer, and the coated product is free from sulfate, sulfide, sulfur and inorganic ash, said composition containing not more than about 10 parts per 100 parts by weight of total polymer of a non-toxic high-boiling polyester plasticizer and not more than about 10% by weight of a polymerized cross-linker selected from the group consisting of allyl methacrylate, diethylene glycol diacrylate, 1,4-butylene glycol dimethacrylate, triethylene glycol dimethacrylate, tetraethylene glycol dimethacrylate, trimethylol propane trimethacrylate, ethylene glycol dimethacrylate diethylene glycol dimethacrylate and diallyl ether of trimethylol propane monomethacrylate.

3. A denture as claimed in claim 2, molded in the form of a plate having integral clasps.

4. A resin composition as claimed in claim 1 containing an ultraviolet stabilizer selected from the group consisting of hydroxy phenyl benzotriazole, 2,2-dihydroxy-4-methoxy benzophenone, methacrylate terminated acetophenone and 2-hydroxy-4-methoxy benzophenone.

5. A molding composition as claimed in claim 4, which is adapted for producing injection molded automobile tail light covers, said molding composiiton being dyed with Sudan Red MR dye and containing 2% by weight of said ultra-violet stabilizer.

6. A method of forming an impact resistant and aging resistant molding composition from methyl methacrylate and butadiene-styrene copolymer comprising mixing a rubbery butadiene-styrene copolymer latex of particle size of from 0.1 to 10 microns with 40–60% methyl methacrylate based on total weight in the presence of free radical catalyst to form aggregates polymerized in situ varying from 20–100 microns in diameter, separating said aggregates, treating the aggregates with strong aqueous alkali at pH 11–13 at a temperature of 20–60° C. for from 1–4 hours, washing with water to pH 7 to be free from sulfate, sulfide, sulfur and inorganic ash and mixing the washed, alkaline-treated particles with methyl methacrylate and polymerizing the methacrylate in the mixture to a molecular weight from 300,000 to 600,000 to provide a molding composition containing from 2–5% of said rubbery butadiene-styrene copolymer and the remaining resin component being said methyl methacrylate having a molecular weight of about 300,000 to 600,000.

7. A molded impact resistant cover for a light adapted to be colored with acrylic soluble dyestuffs made of a translucent resin molding composition consisting essentially of a mixture of at least 90% by weight of polymerized methyl methacrylate of molecular weight 300,000 to 600,000 based upon viscosity in ethylene dichloride and from 2–5% of rubbery butadiene-styrene copolymer latex in particle size of from 0.1 to 10 microns in which the rubbery butadiene-styrene latex particles are co-emulsified with from 40–60%, based on total weight, of methyl methacrylate, the methacrylate being polymerized in situ with free radical polymerization catalyst to coat the copolymer latex with methyl methacrylate polymer and the mixed product is free from sulfate, sulfide, sulfur and inorganic ash.

References Cited

UNITED STATES PATENTS

| 3,095,388 | 6/1963 | Osmond et al. | 260—4 |
| 3,222,423 | 12/1965 | Roebuck | 260—877 |
| 3,261,887 | 7/1966 | Mann | 260—876 |

OTHER REFERENCES

Skinner, Science of Dental Materials (Saunders) (Phila.) (1954), pp. 95–97 and 130.

Whitby, Synthetic Rubber (Wiley) (N.Y.) (1954), pages 201–203 and 555–557.

Schildknecht, "Polymer Processes" (Interscience) (N.Y.) (1956) pp. 153–154.

Modern Plastics Encyclopaedia, 1965 (September 1964) (McGraw-Hill) (N.Y.), pp. 125–129.

MORRIS LIEBMAN, *Primary Examiner.*

H. H. FLETCHER, *Assistant Examiner.*

U.S. Cl. X.R.

106—35; 260—34.2, 41, 879, 885